United States Patent
Sixsmith et al.

(10) Patent No.: US 9,903,512 B2
(45) Date of Patent: Feb. 27, 2018

(54) PIPE CLAMP FOR STRUT SYSTEM

(71) Applicant: Georg Fischer LLC, Tustin, CA (US)

(72) Inventors: Thomas G. Sixsmith, Lake Forest, CA (US); Jörg Wermelinger, Schaffhausen (CH); Casey A. Williamson, Portland, OR (US)

(73) Assignee: Georg Fischer LLC, Irvine, CA (US)

( * ) Notice: Subject to any disclaimer, the term of this patent is extended or adjusted under 35 U.S.C. 154(b) by 0 days.

(21) Appl. No.: 14/721,470

(22) Filed: May 26, 2015

(65) Prior Publication Data

US 2016/0348811 A1  Dec. 1, 2016

(51) Int. Cl.
  *F16L 3/24*  (2006.01)
  *F16L 3/133*  (2006.01)
  *F16L 3/18*  (2006.01)
  *F16L 55/035*  (2006.01)
  *F16L 51/00*  (2006.01)

(52) U.S. Cl.
  CPC ............... *F16L 3/24* (2013.01); *F16L 3/133* (2013.01); *F16L 3/18* (2013.01); *F16L 55/035* (2013.01); *F16L 51/00* (2013.01)

(58) Field of Classification Search
  CPC . F16L 3/24; F16L 3/1075; F16L 3/223; F16L 55/02; F16L 3/12; F16L 3/30; F16L 3/2235; F16L 3/233; F16L 3/26; Y10T 29/4973; B06G 21/055; B06G 2204/41; B06G 2204/1222; H02G 3/22; H02G 3/30
  USPC ......... 248/58, 61–63, 65, 72, 73, 74.1, 74.3, 248/74.4, 49
  See application file for complete search history.

(56) References Cited

U.S. PATENT DOCUMENTS

| 2,469,949 | A |   | 5/1949  | Cantrell |             |
|-----------|---|---|---------|----------|-------------|
| 2,963,309 | A |   | 12/1960 | Stilwell |             |
| 3,229,998 | A | * | 1/1966  | Pennington | F16L 55/17 |
|           |   |   |         |          | 138/99      |
| 3,258,822 | A | * | 7/1966  | Schlesch | F16L 41/06  |
|           |   |   |         |          | 138/99      |
| 3,370,815 | A | * | 2/1968  | Opperthauser | F16L 3/13 |
|           |   |   |         |          | 138/106     |
| 3,526,381 | A | * | 9/1970  | Pepe     | F16L 3/10   |
|           |   |   |         |          | 248/71      |

(Continued)

FOREIGN PATENT DOCUMENTS

EP  1903281 A2  3/2008
JP  2013223377 A  10/2013

OTHER PUBLICATIONS

Applicant Admitted Prior Art: Caddy® Swift Clip Strut Clamp for Insulated Tube/Pipe—TSMI0100, Erico International Corporation, Solon, Ohio. Retrieved Mar. 16, 2015 http://www.erico.com/catalog/parts/TSM10100?pdf=1&language=en&country=US.

(Continued)

*Primary Examiner* — Nkeisha Smith
(74) *Attorney, Agent, or Firm* — Bachman & LaPointe, P.C.

(57) ABSTRACT

A pipe clamp adaptor (50; 300; 400) for securing a pipe (22) comprises the unitarily molded combination of: a cradle (70) having a concave surface (74; 424) for accommodating the pipe and a base surface (72); and a closure (76) connected to the cradle by a living hinge for articulation between an open condition and a closed condition, first features (80) on the cradle engageable to complementary second features (82) of the closure to hold the closed condition.

21 Claims, 13 Drawing Sheets

(56) References Cited

U.S. PATENT DOCUMENTS

| | | | | |
|---|---|---|---|---|
| 4,029,276 A * | 6/1977 | Zielie | F16L 3/10 | 248/74.1 |
| 4,061,299 A * | 12/1977 | Kurosaki | F16L 3/1203 | 248/222.12 |
| 4,109,944 A * | 8/1978 | Curtin | F16L 37/008 | 285/133.11 |
| 4,457,482 A * | 7/1984 | Kitagawa | F16L 3/23 | 248/73 |
| 4,478,381 A * | 10/1984 | Pittion | F16L 3/12 | 24/487 |
| 4,516,296 A * | 5/1985 | Sherman | F16L 3/24 | 24/20 LS |
| 4,669,688 A * | 6/1987 | Itoh | F16L 3/23 | 24/16 PB |
| 4,934,635 A * | 6/1990 | Sherman | F16L 3/10 | 24/279 |
| 4,982,920 A * | 1/1991 | Hungerford, Jr. | F16L 3/12 | 24/487 |
| 5,014,940 A * | 5/1991 | Sherman | F16L 3/04 | 248/62 |
| 5,358,283 A * | 10/1994 | Silva | F16L 21/06 | 285/24 |
| 5,924,655 A | 7/1999 | Rinderer | | |
| 5,984,243 A * | 11/1999 | Pfaller | F16L 3/1066 | 248/74.1 |
| D424,922 S * | 5/2000 | Sherman | D8/395 | |
| 6,105,216 A * | 8/2000 | Opperthauser | F16L 3/24 | 24/279 |
| 6,126,119 A * | 10/2000 | Giangrasso | F16L 59/135 | 248/58 |
| 6,357,196 B1 * | 3/2002 | McCombs | E04C 3/14 | 138/166 |
| 7,053,311 B2 * | 5/2006 | Santanda | H02G 3/34 | 174/135 |
| 7,784,745 B2 * | 8/2010 | Dodge | F16L 3/12 | 138/149 |
| 7,789,351 B2 * | 9/2010 | Auer | B62J 11/00 | 24/16 PB |
| 7,963,487 B2 * | 6/2011 | Saltenberger | F16L 3/1075 | 24/16 PB |
| 8,322,661 B2 | 12/2012 | Oh | | |
| 8,714,591 B1 * | 5/2014 | Kobayashi | B60R 21/06 | 248/72 |
| 8,833,706 B2 * | 9/2014 | Elsmore | F16L 3/1075 | 138/106 |
| 8,882,072 B2 * | 11/2014 | Hattori | B29C 45/006 | 248/230.1 |
| 8,910,912 B2 * | 12/2014 | Child | F16L 3/2235 | 248/68.1 |
| 8,936,161 B2 * | 1/2015 | Kimura | B01D 29/112 | 210/232 |
| 9,074,715 B2 * | 7/2015 | Weger | F16L 55/02 | |
| 2004/0056158 A1 | 3/2004 | Stuart et al. | | |
| 2008/0149362 A1 * | 6/2008 | Ruddick | H02G 3/0418 | 174/68.3 |
| 2010/0038506 A1 * | 2/2010 | King, Jr. | F16L 3/12 | 248/230.7 |
| 2010/0148015 A1 * | 6/2010 | Matsuno | F16L 3/1075 | 248/65 |
| 2010/0155545 A1 * | 6/2010 | Birli | F16L 3/127 | 248/70 |
| 2011/0297797 A1 * | 12/2011 | Yelverton | B60T 11/046 | 248/70 |
| 2012/0292460 A1 * | 11/2012 | Hsu | H02G 7/053 | 248/70 |
| 2013/0206927 A1 * | 8/2013 | Greenfield | F16L 3/11 | 248/58 |
| 2014/0097304 A1 * | 4/2014 | Mastro | F16L 3/24 | 248/73 |
| 2015/0122957 A1 * | 5/2015 | Michiels | F16L 3/1075 | 248/74.2 |
| 2015/0276092 A1 * | 10/2015 | Oliver | F16L 3/24 | 248/65 |

OTHER PUBLICATIONS

Vibra Trol™, Pipe Hangers & Supports, B-Line by Eaton, Sep. 2013, pp. 269&270, Eaton Corporation, Highland, Illinois. Retrieved Mar. 16, 2015 http://www.cooperindustries.com/content/dam/public/bline/Resources/Library/catalogs/pipe_hangers/pipe_hangers_and_supports/vt-vibraclamps.pdf.

Cush-A-Clamp, Cushioning & Clamping Products, May 2004, Tyco Electrical & Metal Products, Wayne, Michigan. Retrieved Sep. 24, 2015 https://www.kleen-ritecorp.com/files/Cush-A-Clamp%20Unistrut%20Manual.pdf Rev. May 2004.

Fastenal Product Standard PH.C.SD.Z, "Clevis Pipe Hanger, Standard Duty, Zinc", Dec. 2013, Fastenal Company, Winona, Minnesota. Retrieved Sep. 25, 2015 https://www.fastenal.com/content/product_specifications/PH.C.SD.Z.pdf.

* cited by examiner

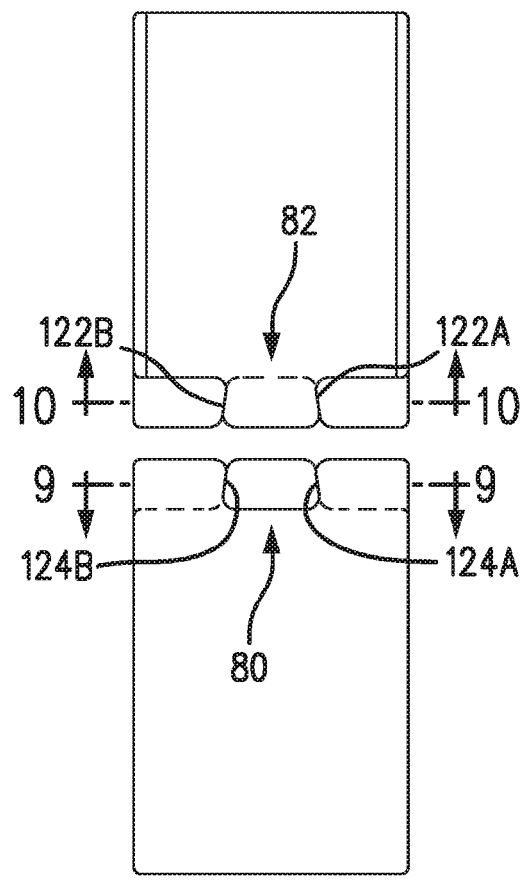
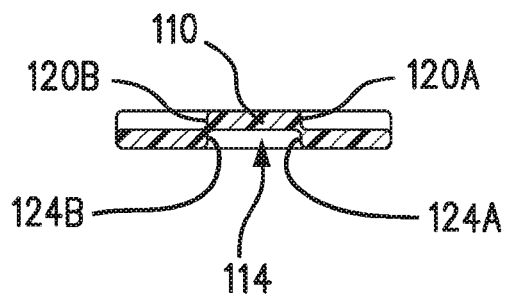 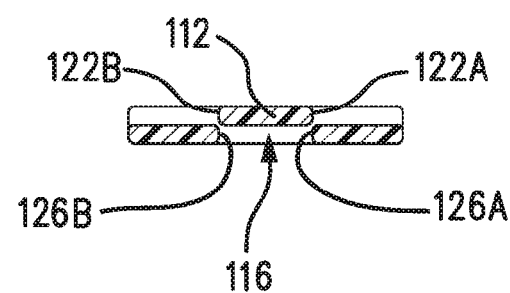
FIG. 8
FIG. 9
FIG. 10

300

PIPE CLAMP FOR STRUT SYSTEM

BACKGROUND

The disclosure relates to pipe clamping. More particularly, the disclosure relates to clamping for construction strut systems.

Construction struts or conduit struts are ubiquitous. Typically formed of steel, they have a generally rectangularized C-shaped cross section. Many have arrays of holes along the base and/or sidewalls.

U.S. Pat. No. 8,322,661 disclosed several pipe clamping systems for use with such struts.

SUMMARY

One aspect of the disclosure involves a pipe clamp adaptor for securing a pipe. The pipe clamp adaptor comprises the unitarily molded combination of: a cradle having a concave surface for accommodating the pipe and a base surface; and a closure connected to the cradle by a living hinge for articulation between an open condition and a closed condition, first features on the cradle engageable to complementary second features of the closure to hold the closed condition.

In one or more embodiments of any of the foregoing embodiments, at opposite first and second longitudinal ends, a respective feature protrudes radially outward from an outer surface of the closure to create a channel for receiving and positioning a member that holds the adaptor.

In one or more embodiments of any of the foregoing embodiments: the first features comprise at least one first dovetail projection and at least one first dovetail compartment; and the second engagement features comprise at least one second dovetail projection and at least one second dovetail compartment.

In one or more embodiments of any of the foregoing embodiments: in the closed condition, the first dovetail projection is received in the second dovetail compartment; and the second dovetail projection is received in the first dovetail compartment.

In one or more embodiments of any of the foregoing embodiments, in the assembled condition a face of the first dovetail projection contacts a face of the second dovetail projection.

In one or more embodiments of any of the foregoing embodiments, a face of the first dovetail projection forms a base of the first dovetail compartment; and a face of the second dovetail projection forms a base of the second dovetail compartment.

In one or more embodiments of any of the foregoing embodiments, the living hinge is a twin hinge having a pair of webs separated by a thicker intermediate portion.

In one or more embodiments of any of the foregoing embodiments, the pipe clamp adaptor is molded from polyethylene in the open condition.

In one or more embodiments of any of the foregoing embodiments, a system comprises: the pipe clamp adaptor; and a metallic member securing the adaptor to environmental structure.

In one or more embodiments of any of the foregoing embodiments: the environmental structure comprises a construction strut, the strut comprising a channel having a pair of rims; and the base surface contacts the strut rims.

In one or more embodiments of any of the foregoing embodiments: the metallic member is a clevis hanger; the environmental structure suspends the clevis hanger from above; and the base surface faces or contacts a cross-bolt of the clevis hanger.

Another aspect of the disclosure involves a pipe clamp system for securing a pipe to a construction strut. The strut comprises a channel having a pair of rims. The system comprises an adaptor comprising the unitarily molded combination of: a base surface for contacting the strut rims; a cradle housing; a closure connected to the cradle by a living hinge, first features on the closure engaged to or engageable to complementary second features of the cradle to resist disengagement. The system further comprises a clamp having: a first member having a first end portion for capture by the channel; and a second member having a first end portion for capture by the channel.

In one or more embodiments of any of the foregoing embodiments: the first features comprise at least one first dovetail projection and at least one first dovetail compartment; and the second engagement features comprise at least one second dovetail projection and at least one second dovetail compartment.

In one or more embodiments of any of the foregoing embodiments: in the closed condition the first dovetail projection is received in the second dovetail compartment; and the second dovetail projection is received in the first dovetail compartment.

In one or more embodiments of any of the foregoing embodiments, in the assembled condition a face of the first dovetail projection contacts a face of the second dovetail projection.

In one or more embodiments of any of the foregoing embodiments: a face of the first dovetail projection forms a base of the first dovetail compartment; and a face of the second dovetail projection forms a base of the second dovetail compartment.

In one or more embodiments of any of the foregoing embodiments, a combination comprises the system and further comprises the construction strut and the pipe.

In one or more embodiments of any of the foregoing embodiments: the base surface contacts the strut rims; the first features on the closure are engaged to the complementary second features of the cradle; the adaptor encircles the pipe; and the first member first end portion and the second member first end portion are captured by the channel so that the clamp holds the adaptor to the strut.

In one or more embodiments of any of the foregoing embodiments, a method for using the system comprises: engaging the first features on the closure to the complementary second features of the cradle; and securing the adaptor to the strut via the clamp.

In one or more embodiments of any of the foregoing embodiments, the method further comprises inserting the pipe into the adaptor.

In one or more embodiments of any of the foregoing embodiments, the inserting of the pipe is an axially transverse inserting into the adaptor before the first features on the closure are engaged to the complementary second features of the cradle.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 8 is a side view of a first adaptor in a partially open condition.

FIG. 9 is a sectional view through cradle engagement features of the first adaptor taken along line 9-9 of FIG. 8.

FIG. 10 is a sectional view of closure engagement features of the first adaptor taken along line 10-10 of FIG. 8.

Like reference numbers and designations in the various drawings indicate like elements.

DETAILED DESCRIPTION

Figure 1:
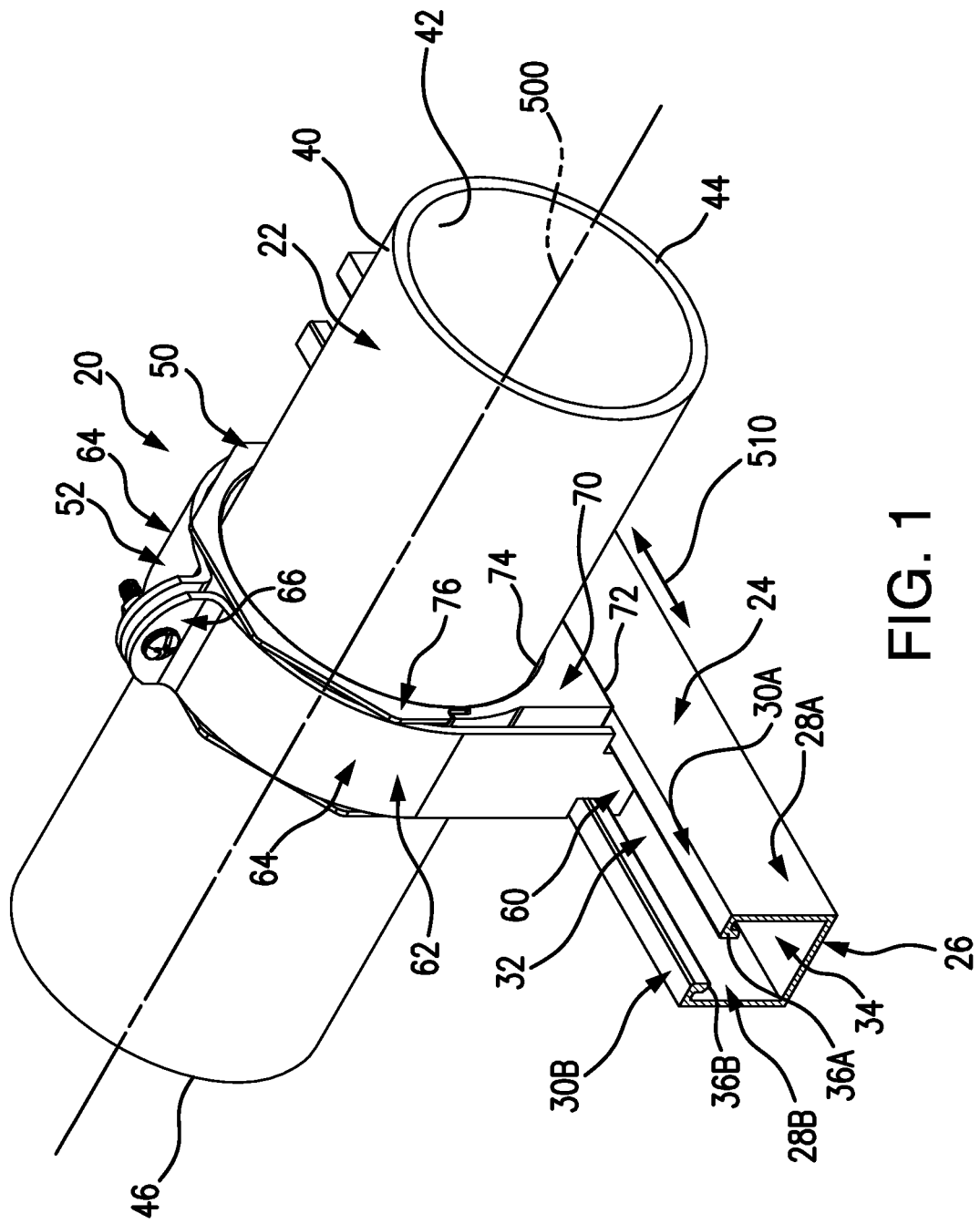
FIG. 1 is a view of a pipe clamped to a construction strut.

FIG. 1 shows a clamp system 20 securing a pipe 22 to a construction 24 (strut). The exemplary strut 24 is formed as a metal (e.g., steel) channel of generally rectangularized C-shaped or U-shaped cross-section. The strut has a base 26 and a pair of sidewalls 28A, 28B extending outward from edges of the base. Extending laterally inward from distal edges of the sidewalls are respective flanges 30A, 30B spaced apart by a channel opening 32 to an interior 34 of the channel. A pair of rails 36A, 36B extend inward from the flanges toward the base. Along the base and sidewalls, the strut may have arrays of apertures (not shown) for mounting the strut.

FIG. 1 shows the pipe 22 as having an outer or outer diameter (OD) surface 40 and an inner or inner diameter (ID) surface 42 and extending between a first end formed by a rim 44 and a second end formed by a rim 46. The pipe is of circular cross-section having a central longitudinal axis 500. The exemplary pipe is mounted with its axis 500 normal to a longitudinal direction 510 of the channel.

The exemplary clamp system 20 comprises an adaptor 50 and a clamp 52. The adaptor 50 surrounds and accommodates the pipe 22. The clamp 52 clamps the adaptor to the strut 24. As is discussed further below, the exemplary adaptor is unitarily formed as a single molded piece (e.g., of a non-metallic material such as a plastic). Exemplary plastic is polyethylene. Exemplary polyethylene is PE100. Contrasted with certain high friction/stiction elastomers, the use of a relatively low friction material allows relative movement of pipe and clamp such as may be required due to differential thermal expansion.

As is discussed below, the exemplary adaptor has an open as-molded condition and has a closed condition when installed to the pipe and strut. The exemplary clamp 52 is formed as a strap (e.g., a metallic strap) partially surrounding the adaptor (e.g., extending from a first end feature 60 for securing to the strut to a second end feature 60 for securing to the strut). In an installed condition of the clamp, the clamp has a general U-shape extending between the features 60. The exemplary strap portion 62 is formed as two identical pieces 64 each extending from its associated end feature 60 to a feature 66 for drawing the two pieces together. An exemplary feature 66 for drawing two pieces together comprises an end flange 66 having an aperture 68. The combined apertures 68 pass a fastener 69 securing the two pieces together. An exemplary fastener 69 is a threaded fastener (e.g., screw or bolt) with a head against one flange 66, a shaft passing through the apertures 68, and a nut on the shaft engaging the other flange 66.

Figure 3:
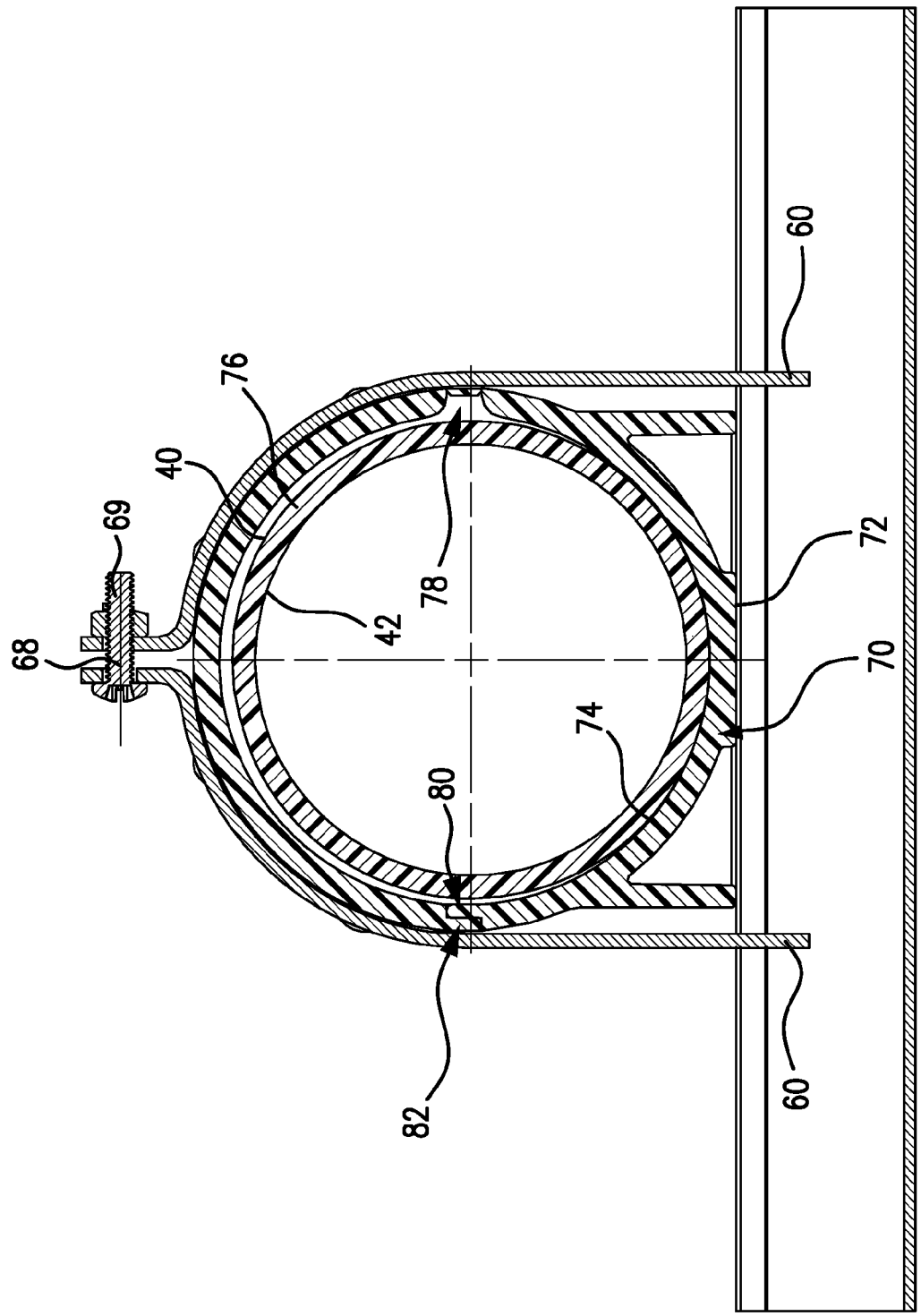
FIG. 3 is a transverse sectional view of the clamped pipe taken along line 3-3 of FIG. 2 with cut plane transverse to the pipe axis and along the longitudinal direction of the strut.
Figure 5:
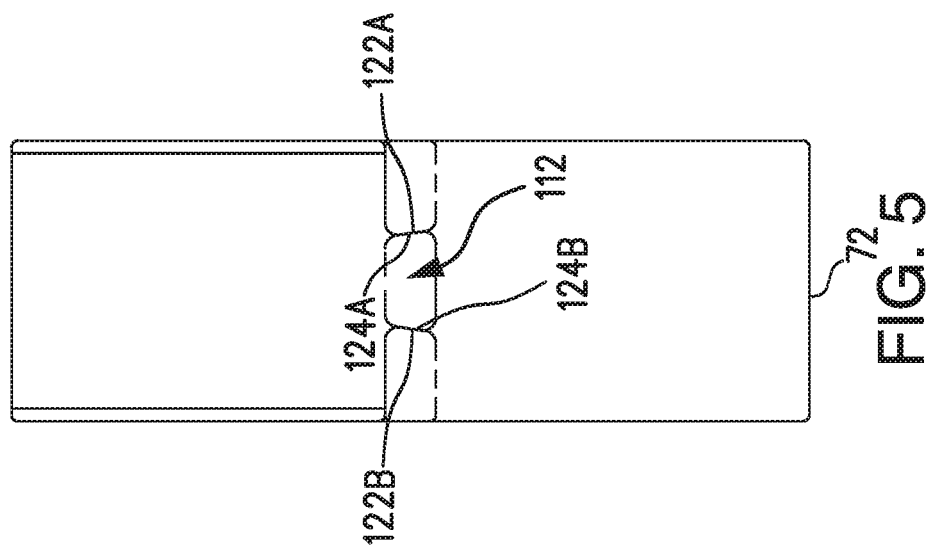
FIG. 5 is a side view of the closed first adaptor.
Figure 4:
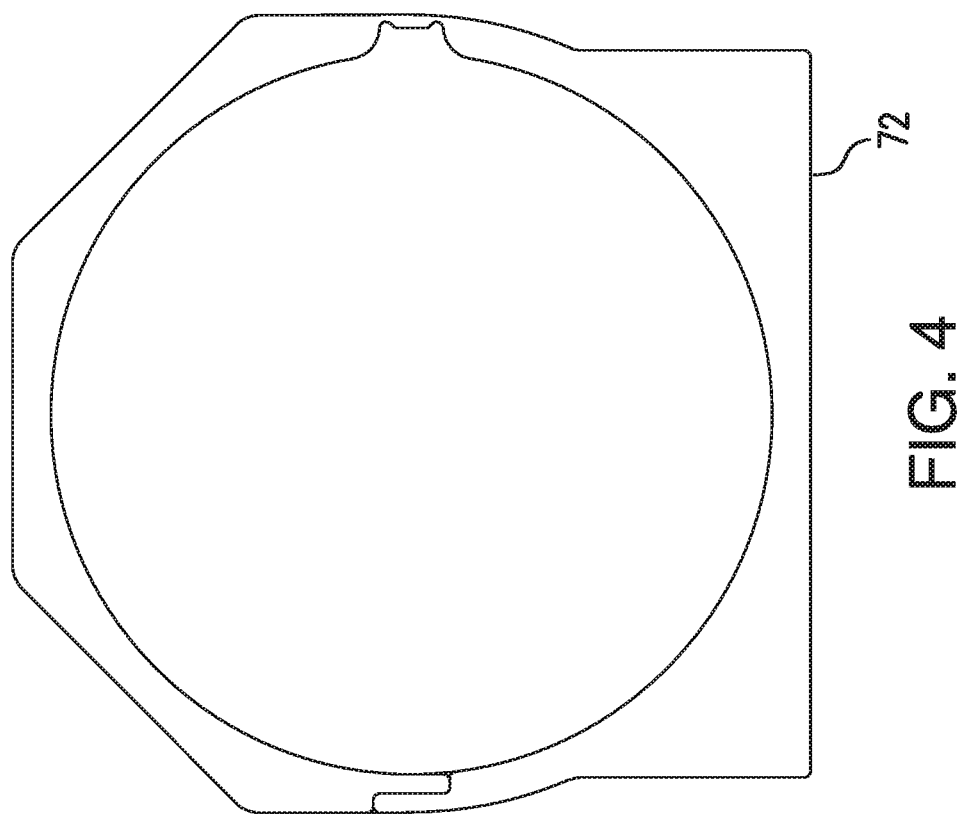
FIG. 4 is an end view of a first adaptor in a closed condition.
Figure 6:
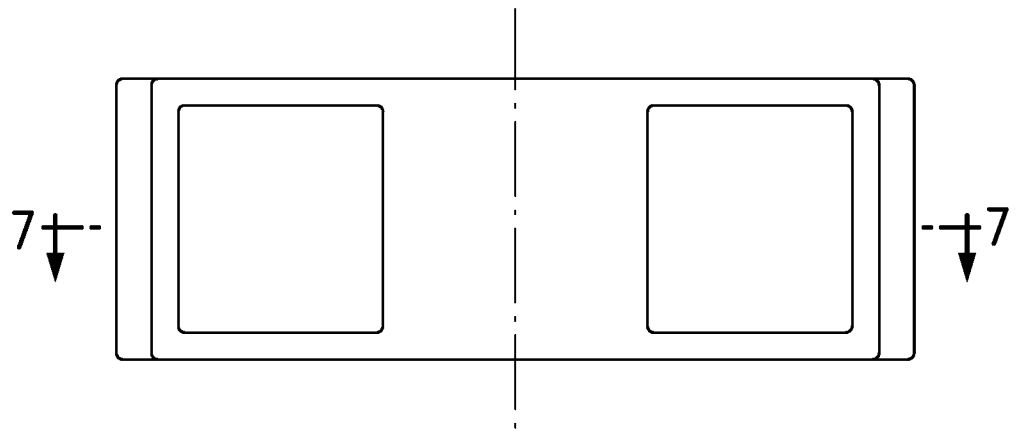
FIG. 6 is a base end view of the closed first adaptor.

The adaptor has a base or cradle portion 70 having a base surface 72 for contacting the strut rims in the installed condition. Opposite the surface 72, the cradle includes an arcuate cradle surface 74 (e.g., approximately semi-cylindrical) for cradling the pipe and forming a portion of an aperture of the adaptor that receives the pipe). The adaptor further comprises a closure 76 connected to the cradle by a living hinge 78 (FIG. 3). The closure has a proximal end at the hinge 78 and a distal end formed by engagement features 82 for engaging associated features 80 of the cradle in the closed condition.

Figure 7:
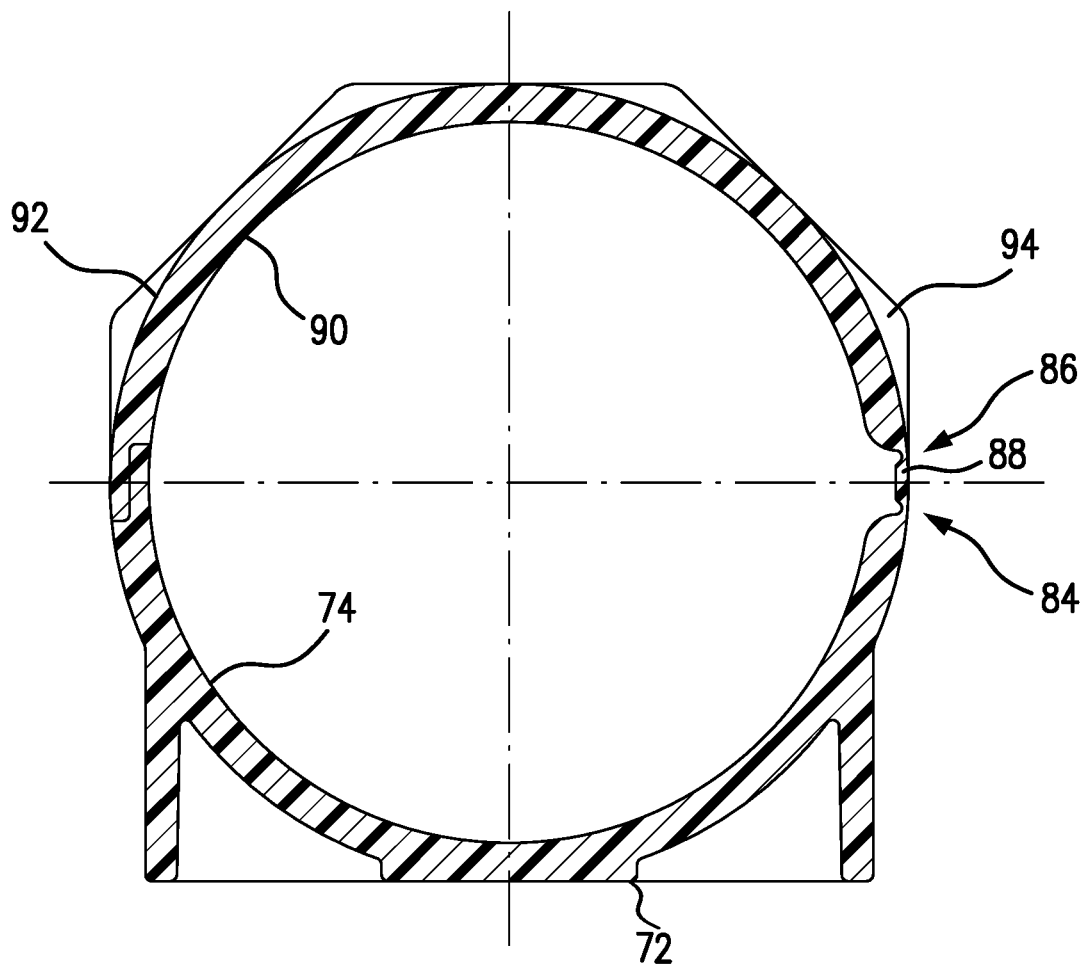
FIG. 7 is a sectional view of the closed first adaptor taken along line 7-7 of FIG. 6.

The exemplary hinge 78 is a dual axis hinge or twin hinge (alternatively identified as two hinges) wherein a pair of thin webs of the plastic material 84 and 86 (FIG. 7) separate a thicker narrow strip 88 from the adjacent portions of the cradle and closure respective. Thus, flexing of each of the webs 84, 86 defines a respective associated hinge axis. Such a twin hinge may provide improved moldability. FIG. 7 also shows a concave interior/inner diameter (ID) surface 90 of the closure and an opposite outboard/outer diameter (OD) surface 92. The exemplary surface 90 and cradle surface 74 may form portions of a circle of slightly greater than the pipe outer diameter when in the closed condition. This may provide clearance to accommodate various expansions and shifts (e.g., in accordance with seismic codes). An exemplary diametric clearance is about three millimeters for typical pipe sizes (e.g. about 1.5 millimeters to 4.0 millimeters or about 2.0 to 6.0 percent of the pipe outer diameter, more narrowly 2.5 percent to 5.0 percent). At opposite longitudinal ends, sidewall or other features (94) may protrude radially outward from the OD surface 92 to create a channel for receiving and positioning the strap.

Figure 2:
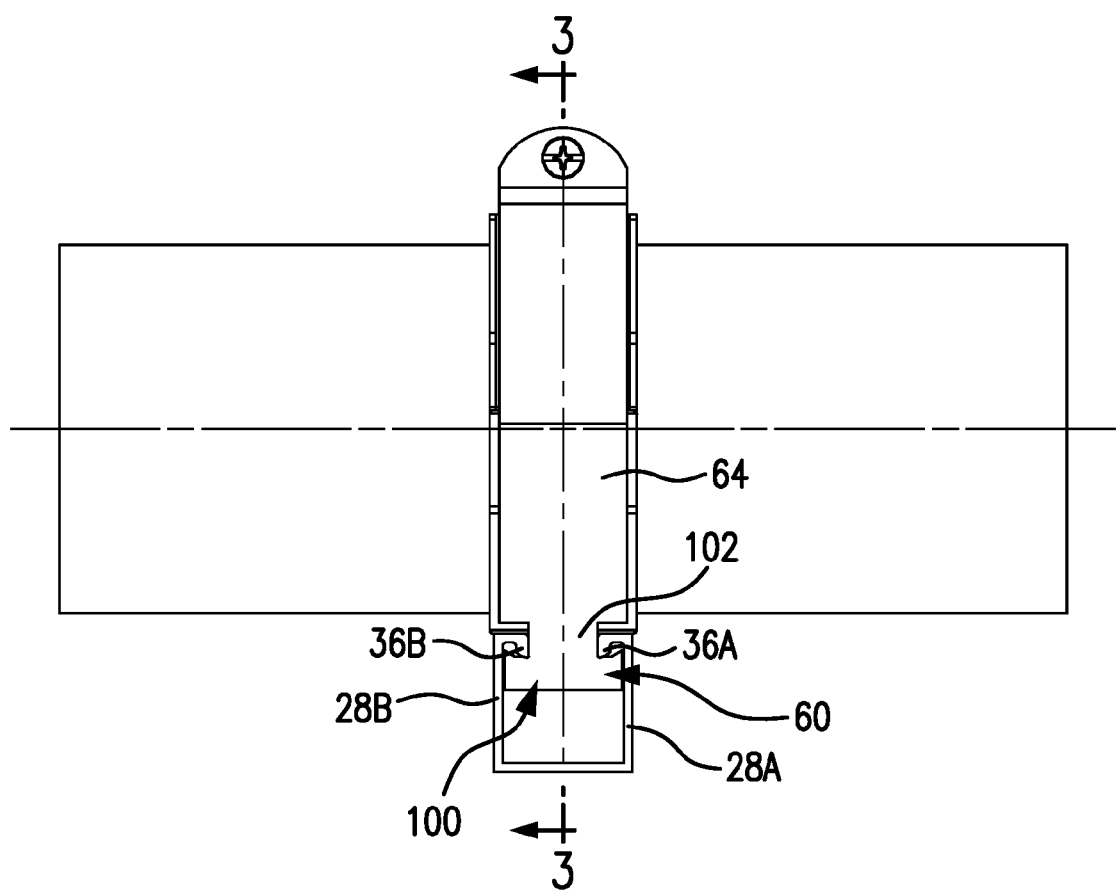
FIG. 2 is a side view of the clamped pipe (i.e., along the longitudinal direction of the strut) as if the strut were cut away or containing the end of the strut.

The exemplary strap features 60 (FIG. 2) comprise a head 100 at the end of a neck 102 connecting to a main portion of the strap piece 64. The exemplary strip may be cut from sheetmetal strip stock with portions cut from each edge to leave the neck 102. Opposite sides of the head 100 may have projections for capturing between the rails 36A, 36B and associated sidewall 28A, 28B.

FIGS. 5, 8, 9, and 10 show details of the exemplary features 80 and 82. The features 80 and 82 comprise interdigitable dovetail fingers and complementary dovetail compartments or recesses. Each feature 80, 82 has three dovetail fingers side-by-side with dovetail compartments opposite the fingers. In this three-finger and compartment implementation, the center finger (110 of feature 80 and 112 of feature 82 in FIGS. 9 and 10) and compartment (114 of feature 80 and 116 of feature 82) are full dovetails having two longitudinal side edges flaring outwardly toward the end of the feature for the projections (edges 120A, 120B and 122A, 122B) and inwardly for the compartments (edges 124A, 124B (FIG. 5) and 126A, 126B). The two lateral projections and compartments of the features 80, 82 are half dovetails, having one such flaring longitudinal side edge. Thus, the interlocking dovetail effect is of the adjacent/contacting longitudinal side edge of a given projection of one feature with the associated longitudinal side edge of the associated compartment of the other feature. When closed, a given dovetail finger of one of the features 80, 82 is received in the adjacent dovetail pocket of the other feature while the pocket associated with such finger receives the finger associated with the pocket of the other feature. In the illustrated embodiment, the features and pockets are each approximately half the thickness of the adjacent portion of the closure 76 and base 70 so that, when assembled, thickness is essentially continuous across the closure and base.

Figure 14:
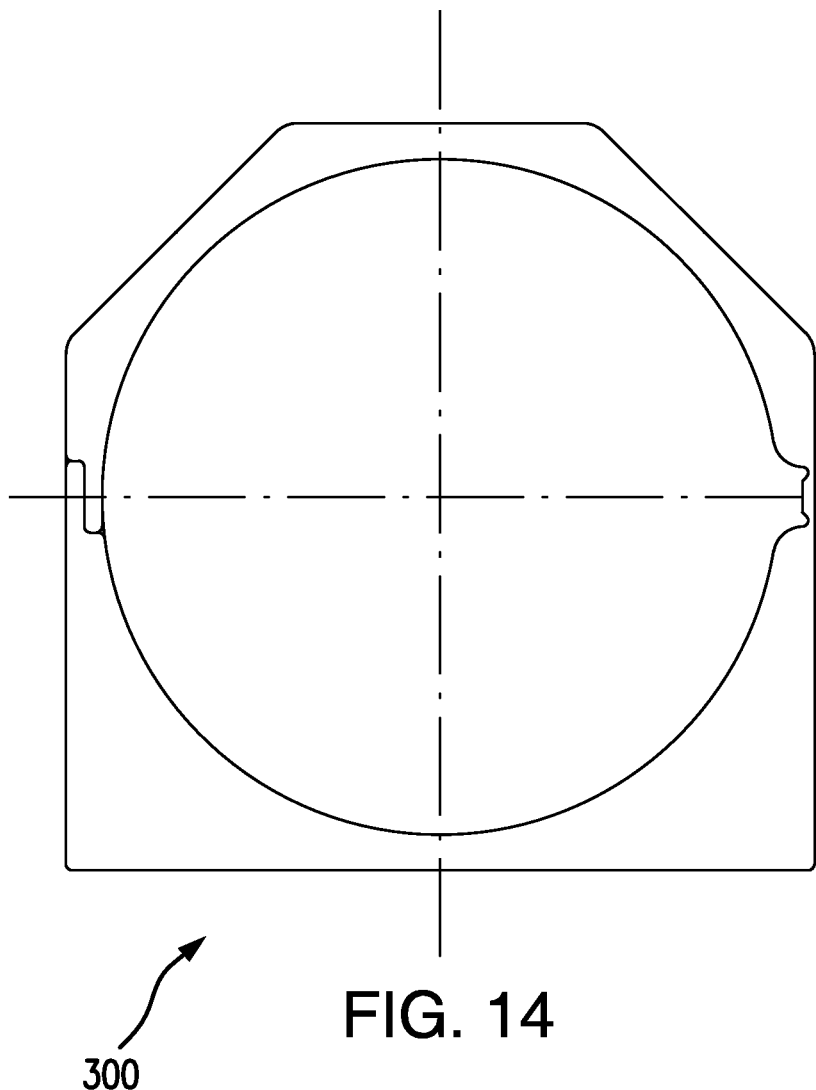
FIG. 14 is an end view of a second adaptor in a closed condition.
Figure 15:
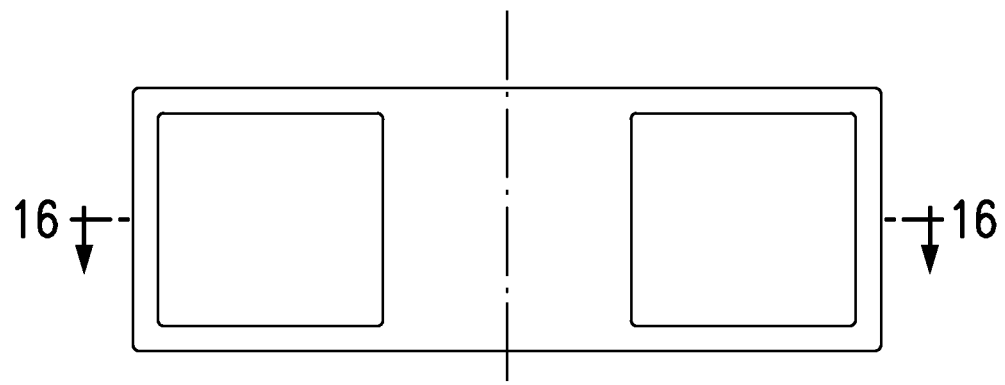
FIG. 15 is a base end view of the second adaptor.
Figure 16:
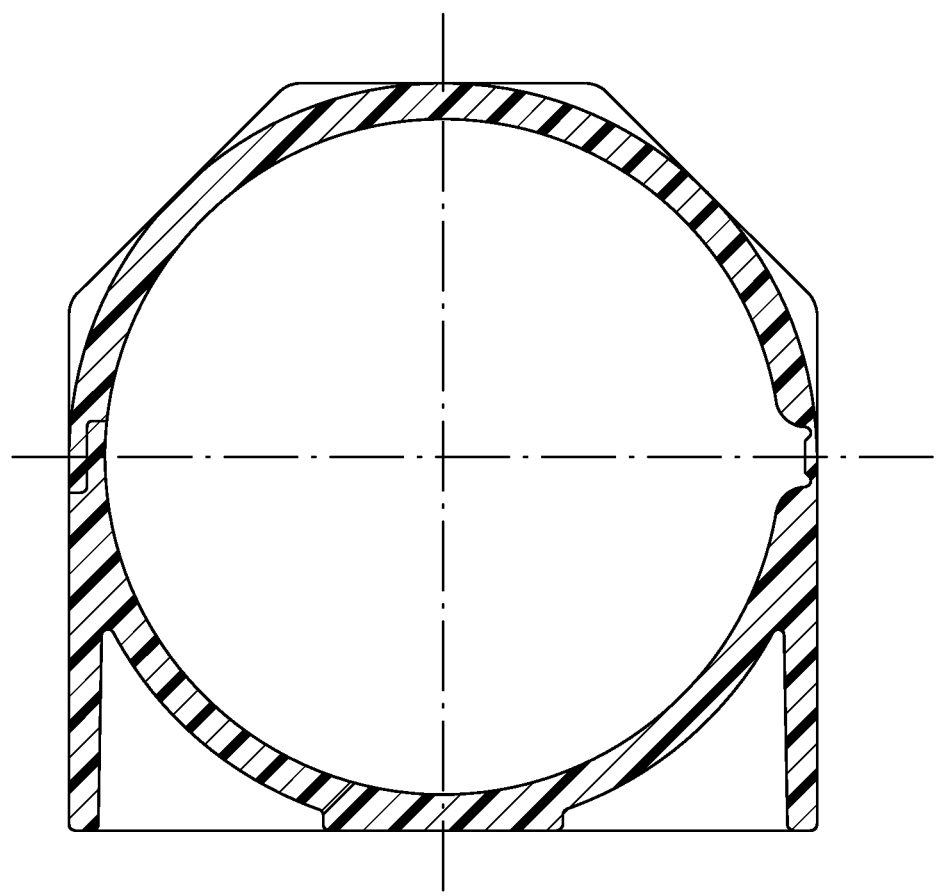
FIG. 16 is a sectional view of the second adaptor taken along line 16-16 of FIG. 14.

A second illustrated adaptor embodiment 300 (FIGS. 14-16) has a broader base surface than does the first adaptor (i.e., the base width along the length of the strut is essentially the same as the outer diameter of the closure).

Yet further embodiments may involve artifacts of manufacture. It may be possible to scale the clamp system directly for each nominal pipe diameter. For example, the strap width and adaptor thickness (transverse to the strut) could still be based on the strut size. However, the adaptor width and radius of curvature of its inner diameter (ID) surfaces could be proportional to the change in pipe outer diameter. Closure thickness (between its inner diameter (pipe-engaging) surface and its outer surface) could vary with pipe diameter or could be less sensitive to pipe diameter).

However, one group of variations involves reusing mold cavities used to mold adaptors for larger pipe to also mold adaptors for smaller pipe. Rather than mere scaling, spacer features may be added to the molded adaptors for the smaller pipe. For example, the portion of the mold that forms the concave surface of the cradle may be multiple pieces with removable inserts. One insert may be sized to mold the concave surface for the largest anticipated size of pipe. Smaller inserts (or no insert at all) could provide for smaller diameter pipe by allowing the molding of a spacer radially inwardly beyond what would have been the cradle ID surface and closure ID surface associated with the largest anticipated pipe.

Figure 11:
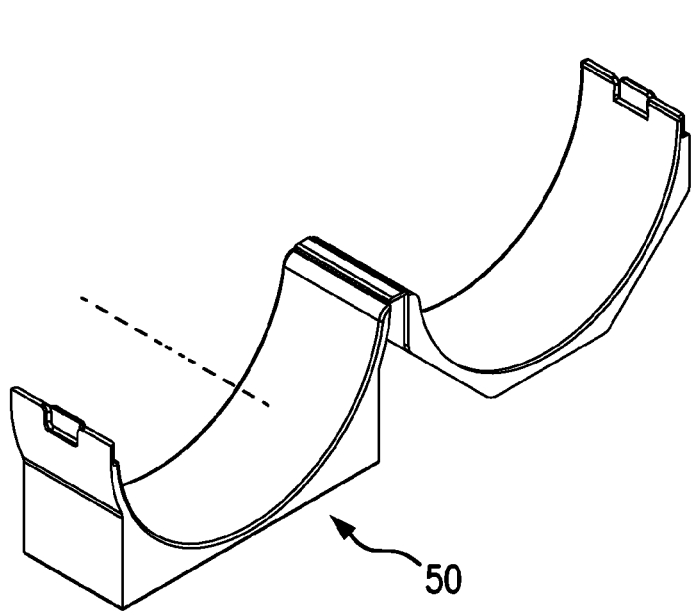
FIG. 11 is a view of the first adaptor in a fully open, as-molded, condition.
Figure 12:
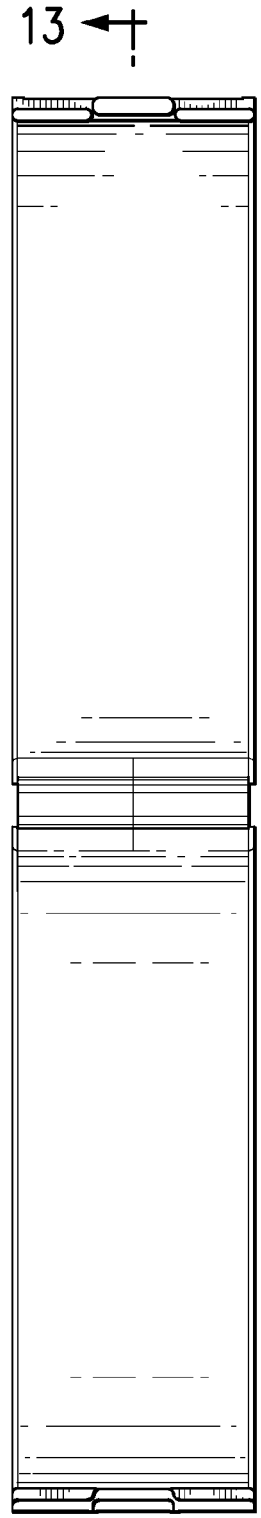
FIG. 12 is a view of the open adaptor of FIG. 11 facing the cradle interior.
Figure 13:
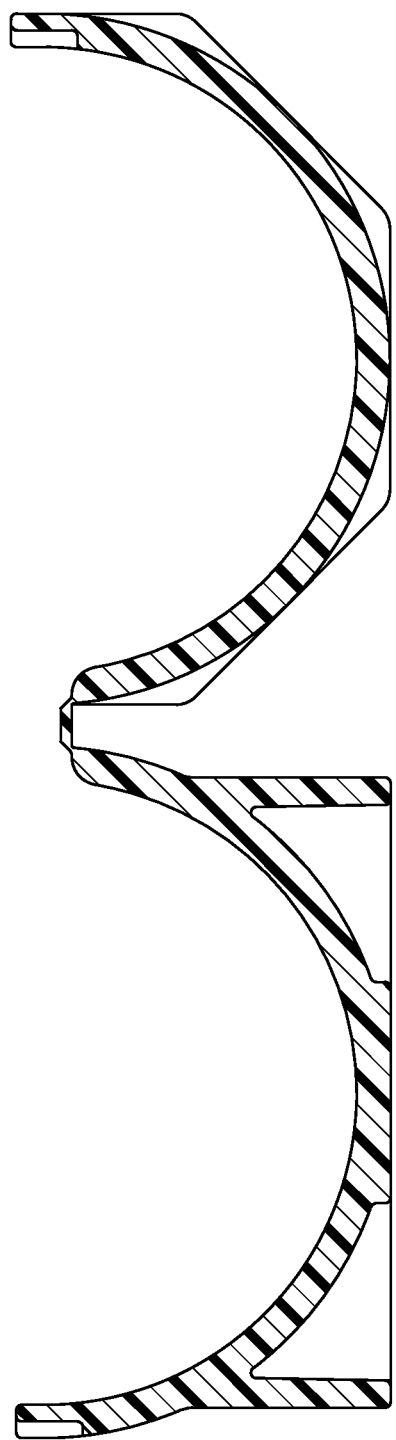
FIG. 13 is a sectional view of the adaptor taken along line 13-13 of FIG. 12.
Figures 17, 18:
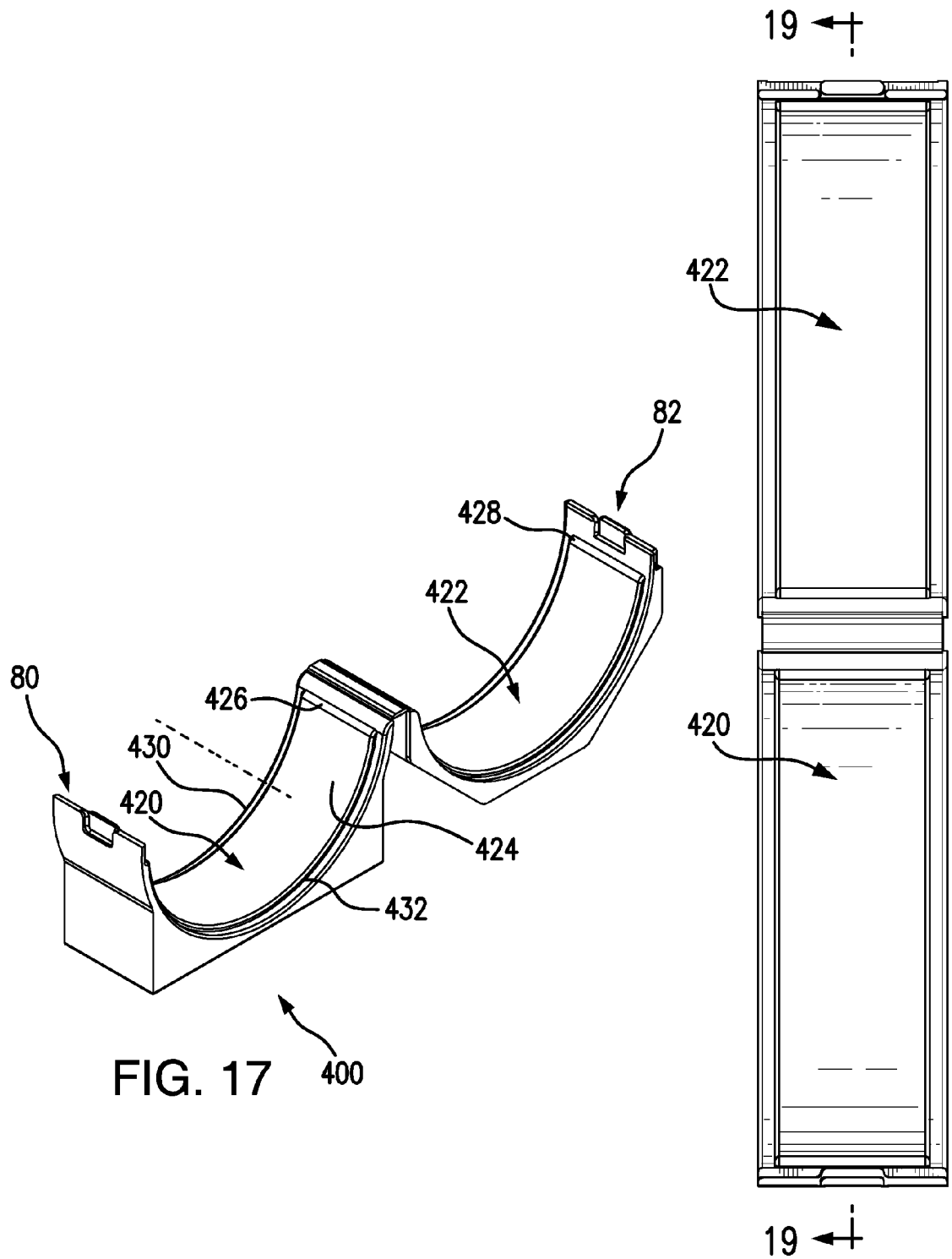
FIG. 17 is a view of a third adaptor in a fully open, as-molded, condition.
FIG. 18 is a view of the third adaptor of FIG. 17 facing the cradle.

FIG. 17 shows one example 400 of such a re-sized adaptor. Otherwise the same as the first adaptor, the cradle and closure are molded with radial spacers 420 and 422 to accommodate a slightly smaller pipe than the first adaptor. For example, the two different pipe sizes may be the closest metric and English counterparts to each other. One example is nominal four inch pipe used with the first adaptor of FIG. 11. This has a true outer diameter of 4.5 inch (114.3 mm). Its metric analogue is 110 mm pipe with a true outer diameter of 110 mm. The addition of the spacers may allow the basic mold for a four inch pipe adaptor to be used to produce an adaptor for 110 mm pipe.

FIG. 17 shows each spacer 420, 422 as having an inner diameter (ID) surface 424 and extending between an end 426 proximate the hinge and an end 428 proximate the engagement features 80, 82. Axially/longitudinally, the spacers extend from a first end 430 to a second end 432. These ends may be recessed slightly relative to the axial/longitudinal ends of the cradle and closure, thus leaving intact a portion of the cradle and closure ID surfaces 74, 90 of the baseline first adaptor. This configuration may simply reflect an article of ease of manufacture. A basic mold may be configured to mold the larger FIG. 17 adaptor 400 and thus may have compartment/recesses corresponding to the spacers 420 and 422. For use in molding the first adaptor, inserts may be placed in these compartments to essentially completely fill the compartments. In yet other variations, inserts may be included in a compartment for molding both sizes but merely with larger inserts being used to mold the first adaptor of FIG. 11 versus the third adaptor of FIG. 17.

Figure 19:
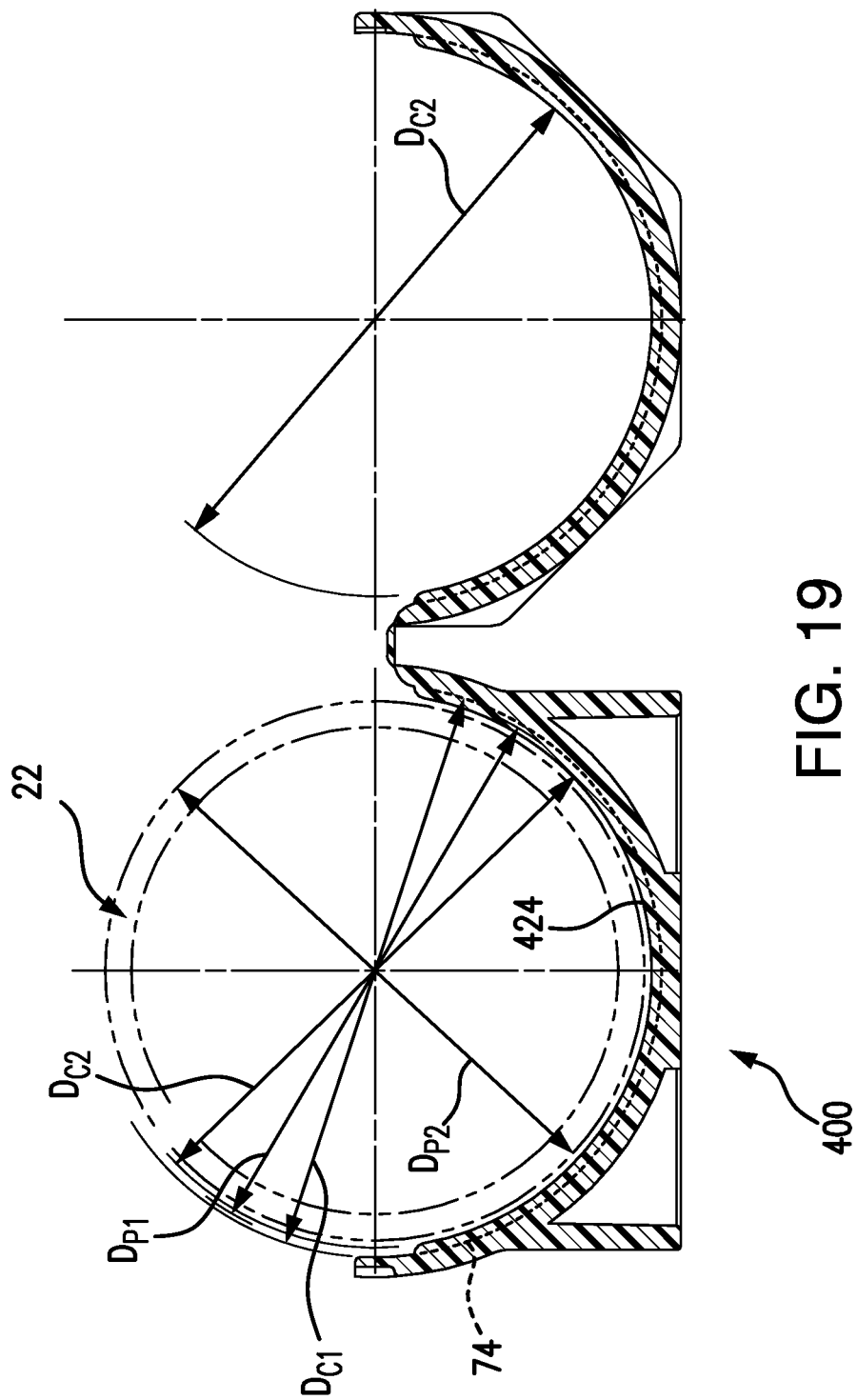
FIG. 19 is a sectional view of the third adaptor taken along line 19-19 of FIG. 18 and showing, superimposed, details of a complementary pipe and geometric dimensions including dimensions of the first adaptor.

FIG. 19 shows several dimensions associated with the adaptor 400 of FIG. 17. The pipe 22 accommodated in the cradle is shown having a diameter $D_{P2}$. Additionally, $D_{P1}$ represents the slightly larger diameter of pipe used with the corresponding baseline cradle 50. Similarly, an effective diameter (twice the radius of curvature) of the surface 424 is shown as $D_{C2}$. The corresponding diameter of the surface 74 is shown as $D_{C1}$. The corresponding dimensions for the closure may be similar. Exemplary cradle diameters or radii of curvature are respectively slightly greater than the corresponding pipe outer diameter or radius of curvature to allow the pipe to be slightly loosely held allowing for various axial or radial contractions, expansions, or other movements.

Figure 20:
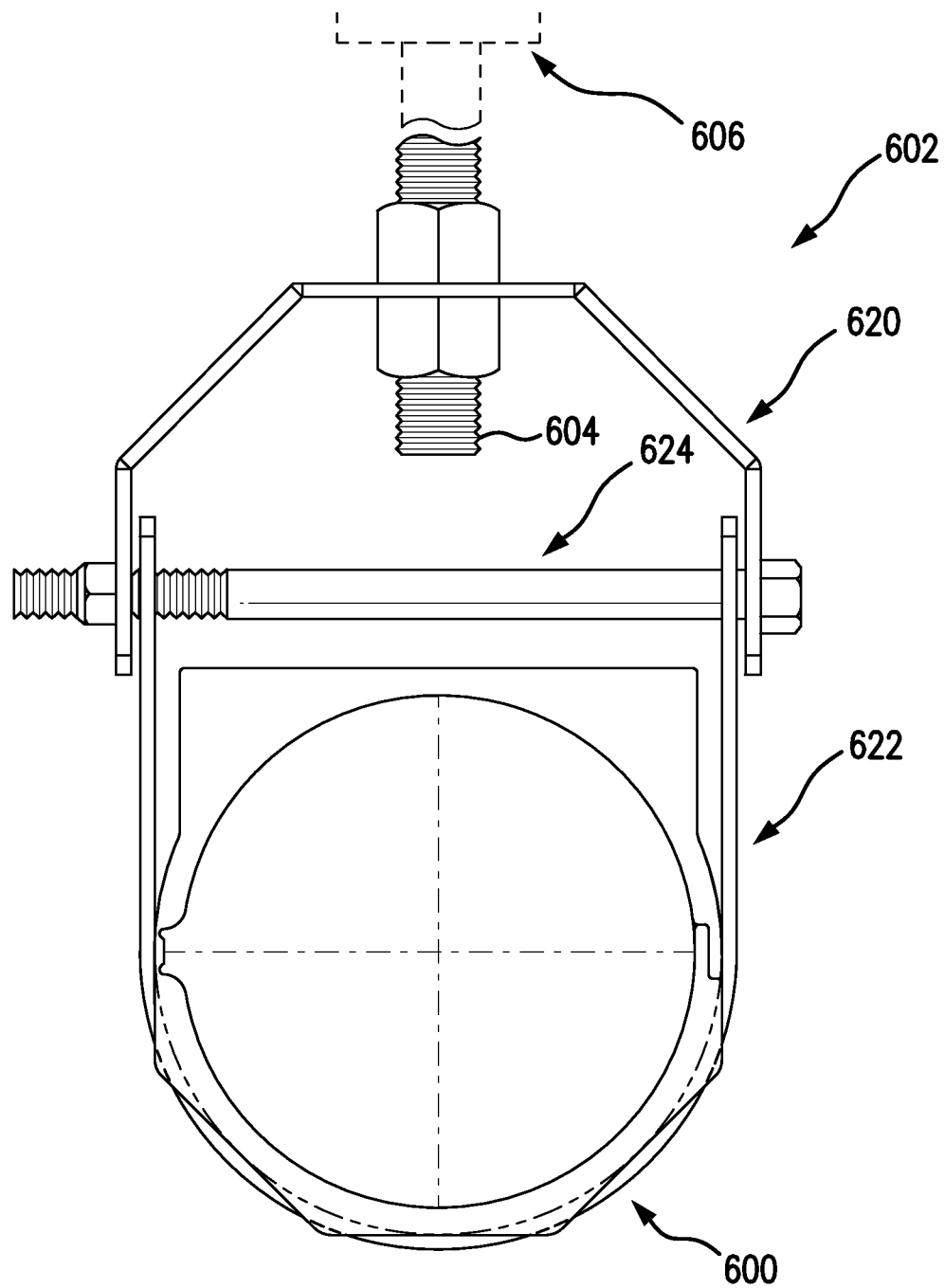
FIG. 20 is an end view of the first adaptor captured by a clevis hanger.

FIG. 20 shows a system 600 having similar adaptor held by a clevis hanger 602. The hanger is suspended from above via a threaded hanger rod 604 secured to an environmental structure 606 such as a ceiling, joist, beam, or the like. The lower end portion of the rod is secured by nuts through an aperture in a center portion of an upper hanger member 620. A U-shaped lower hanger member 622 carries the pipe via the adaptor. A single cross-bolt 624 extends through apertures at lower ends of the arms of the upper member and apertures at upper ends of arms of the lower member. Due to the presence of the adaptor, the clevis hanger may be a slightly larger size than would be used for a given pipe size without the adaptor.

The adaptor and strap may be made using otherwise conventional or yet-developed materials and techniques.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A pipe clamp adaptor (50; 300; 400) securing a pipe (22), the pipe clamp adaptor comprising a unitarily molded combination of:
   a cradle (70) having a concave surface (74; 424) for accommodating the pipe and a base surface (72); and
   a closure (76) connected to the cradle by a living hinge for articulation between an open condition and a closed condition, first features (80) on the cradle engageable to complementary second features (82) of the closure to hold the closed condition,
   wherein:
      the first features comprise at least one first dovetail projection and at least one first dovetail compartment;
      the second features comprise at least one second dovetail projection and at least one second dovetail compartment; and
      in the closed condition:
         the combination has a diametric clearance of 1.5 millimeters to 4.0 millimeters with the pipe;
         the first dovetail projection is received in the second dovetail compartment;
         the second dovetail projection is received in the first dovetail compartment;
         a face of the first dovetail projection contacts a face of the second dovetail projection;
         at least one longitudinal side edge of the first dovetail projection interlocks with at least one longitudinal side edge of the second dovetail compartment; and
         at least one longitudinal side edge of the second dovetail projection interlocks with at least one longitudinal side edge of the first dovetail compartment.

2. The pipe clamp adaptor of claim 1 wherein:
   at opposite first and second longitudinal ends, a respective feature (94) protrudes radially outward from an outer surface (92) of the closure to create a channel for receiving and positioning a member (64; 622) that holds the adaptor.

3. The pipe clamp adaptor of claim 2 wherein:
   the pipe clamp adaptor consists of a single molded polyethylene piece.

4. The pipe clamp adaptor of claim 1 wherein:
   the pipe clamp adaptor consists of a single molded polyethylene piece.

5. The pipe clamp adaptor of claim 1 wherein:
   the face of the first dovetail projection forms a base of the first dovetail compartment; and
   the face of the second dovetail projection forms a base of the second dovetail compartment.

6. The pipe clamp adaptor of claim 1 wherein:
   the living hinge is a twin hinge having a pair of webs (84, 86) separated by a thicker intermediate portion (88).

7. The pipe clamp adaptor of claim 1 being molded from polyethylene in the open condition.

8. A system comprising:
   a pipe (22);
   a pipe clamp adaptor (50; 300; 400) securing the pipe (22), the pipe clamp adaptor comprising a unitarily molded combination of:
      a cradle (70) having a concave surface (74; 424) for accommodating the pipe and a base surface (72); and
      a closure (76) connected to the cradle by a living hinge for articulation between an open condition and a closed condition, in said closed condition the combination having a diametric clearance of 1.5 millimeters to 4.0 millimeters with the pipe, first features (80) on the cradle engageable to complementary second features (82) of the closure to hold the closed condition; and
   a metallic member securing the adaptor to environmental structure,
   wherein
      the metallic member is a clevis hanger;
      the environmental structure suspends the clevis hanger from above; and
      the base surface faces or contacts a cross-bolt of the clevis hanger.

9. The system of claim 8 wherein:
   the first features comprise at least one longitudinal side edge; and
   the second features comprise at least one longitudinal side edge backlocked to the at least one longitudinal side edge of the first features.

10. A system comprising:
    a pipe (22);
    a pipe clamp adaptor (50; 300; 400) securing the pipe (22), the pipe clamp adaptor comprising a unitarily molded combination of:
       a cradle (70) having a concave surface (74; 424) for accommodating the pipe and a base surface (72); and
       a closure (76) connected to the cradle by a living hinge for articulation between an open condition and a closed condition, in said closed condition the combination having a diametric clearance of 1.5 millimeters to 4.0 millimeters with the pipe, first features (80) on the cradle engageable to complementary second features (82) of the closure to hold the closed condition; and
    a metallic member securing the adaptor to environmental structure,
    wherein:
       the environmental structure comprises a construction strut (24), the strut comprising a channel having a pair of rims;
       the base surface contacts the strut rims; and
       the metallic member comprises a clamp extending from a first end feature secured to the strut to a second end feature secured to the strut to partially surround the adaptor.

11. A pipe clamp system (20) securing a pipe (22) to a construction strut (24), the strut comprising a channel having a pair of rims, the system comprising:
    an adaptor comprising a unitarily molded combination of:
       a base surface for contacting the strut rims;
       a cradle housing; and
       a closure connected to the cradle by a living hinge, first features on the closure engaged to or engageable to complementary second features of the cradle to resist disengagement;
    a diametric clearance of 2.0 to 6.0 percent of a pipe outer diameter between the adaptor and the pipe; and
    a clamp having:
       a first member (64) having a first end portion (60) for capture by the channel;
       a second member (64) having a first end portion (60) for capture by the channel.

12. The pipe clamp system of claim 11 wherein:
    the first features comprise at least one first dovetail projection and at least one first dovetail compartment; and the second features comprise at least one second dovetail projection and at least one second dovetail compartment.

13. The pipe clamp system of claim 12 wherein:
in the closed condition, the first dovetail projection is received in the second dovetail compartment; and
the second dovetail projection is received in the first dovetail compartment.

14. The pipe clamp system of claim 13 wherein:
in the assembled condition, a face of the first dovetail projection contacts a face of the second dovetail projection.

15. The pipe clamp system of claim 13 wherein:
a face of the first dovetail projection forms a base of the first dovetail compartment; and
a face of the second dovetail projection forms a base of the second dovetail compartment.

16. The pipe clamp system of claim 11, wherein:
the base surface directly contacts the construction strut.

17. The pipe clamp of claim 11 wherein:
the base surface contacts the strut rims;
the first features on the closure are engaged to the complementary second features of the cradle;
the adaptor encircles the pipe; and
the first member first end portion and the second member first end portion are captured by the channel so that the clamp holds the adaptor to the strut.

18. A method for using the system of claim 11, the method comprising:
engaging the first features on the closure to the complementary second features of the cradle; and
securing the adaptor to the strut via the clamp.

19. The method of claim 18 further comprising inserting the pipe into the adaptor.

20. The method of claim 19 wherein:
the inserting of the pipe is an axially transverse inserting into the adaptor before the first features on the closure are engaged to the complementary second features of the cradle.

21. The pipe clamp system of claim 11 wherein:
the first features comprise at least one longitudinal side edge; and
the second features comprise at least one longitudinal side edge backlocked to the at least one longitudinal side edge of the first features.

* * * * *